(12) United States Patent
Sutton et al.

(10) Patent No.: US 10,927,217 B2
(45) Date of Patent: Feb. 23, 2021

(54) PROCESS FOR PREPARING POLYMERS

(71) Applicant: Ascend Performance Materials Operations LLC, Houston, TX (US)

(72) Inventors: James P. Sutton, Houston, TX (US); John M. Zabcik, Houston, TX (US); Chris Schwier, Houston, TX (US); Cihan Uzunpinar, Houston, TX (US); Shahram Akbari, Houston, TX (US)

(73) Assignee: Ascend Performance Materials Operations LLC, Houston, TX (US)

( * ) Notice: Subject to any disclaimer, the term of this patent is extended or adjusted under 35 U.S.C. 154(b) by 176 days.

(21) Appl. No.: 16/283,001

(22) Filed: Feb. 22, 2019

(65) Prior Publication Data

US 2019/0263967 A1 Aug. 29, 2019

Related U.S. Application Data

(60) Provisional application No. 62/634,546, filed on Feb. 23, 2018.

(51) Int. Cl.
*C08G 69/30* (2006.01)
*C08G 69/28* (2006.01)
(Continued)

(52) U.S. Cl.
CPC .......... *C08G 69/30* (2013.01); *B01D 5/0012* (2013.01); *B01J 19/006* (2013.01); *B01J 19/1818* (2013.01); *B01J 19/24* (2013.01); *C08G 69/28* (2013.01); *B01J 2219/0004* (2013.01); *B01J 2219/00081* (2013.01); *B01J 2219/00162* (2013.01); *B01J 2219/00768* (2013.01); *B01J 2219/182* (2013.01); *B01J 2219/2419* (2013.01)

(58) Field of Classification Search
CPC ...... C08G 69/30; C08G 69/28; B01D 5/0012; B01J 19/006; B01J 19/1818; B01J 19/24; B01J 2219/0004; B01J 2219/00081; B01J 2219/00162; B01J 2219/00768; B01J 2219/182; B01J 2219/2419
USPC .......................................................... 526/64
See application file for complete search history.

(56) References Cited

U.S. PATENT DOCUMENTS

| 2008/0139760 A1 | 6/2008 | Debruin |
| 2011/0077353 A1 | 3/2011 | Debruin et al. |

FOREIGN PATENT DOCUMENTS

| CA | 691906 | * | 8/1964 |
| JP | 2008081634 | | 4/2008 |

(Continued)

OTHER PUBLICATIONS

International Application No. PCT/US2019/019211, "International Search Report and Written Opinion", dated Jun. 3, 2019, 13 pages.

*Primary Examiner* — William K Cheung
(74) *Attorney, Agent, or Firm* — Cozen O'Connor

(57) ABSTRACT

The present disclosure relates to a process for preparing polymers using a plug flow reactor. The process includes providing an aqueous monomer solution comprising amide monomers; evaporating the aqueous monomer solution to form a concentrated monomer solution; and polymerizing the concentrated monomer solution in a plug flow reactor comprising a shell side and a tube side to form a first process fluid comprising polymers. The concentrated monomer solution flows on the shell side from the inlet to the outlet.

20 Claims, 3 Drawing Sheets

(51) Int. Cl.
  *B01J 19/24* (2006.01)
  *B01J 19/18* (2006.01)
  *B01D 5/00* (2006.01)
  *B01J 19/00* (2006.01)

(56) References Cited

FOREIGN PATENT DOCUMENTS

WO 2014179044 11/2014
WO 2014198757 12/2014

\* cited by examiner

PROCESS FOR PREPARING POLYMERS

FIELD

The present disclosure relates to a process of making polymers, e.g., polyamides. More specifically, the present disclosure relates to a process that utilizes a plug flow reactor configuration that beneficially enables operation at lower temperatures and prevents gelling, foaming, and impurities in the polymer product. The present disclosure further relates to a process for retrofitting an existing polymerization process using the aforementioned configuration.

BACKGROUND

Polyamides are conventionally prepared by the condensation polymerization of a diacid, such as adipic acid, and a diamine, such as hexamethylene diamine, or by the polymerization of lactams such as ε-caprolactam. Conventional processes for preparing polyamides, e.g., nylon 6,6, utilize well-known components and configurations usually including a vessel containing a process fluid, e.g., a salt solution of diacid and diamine, a conventional polymerization reactor, and further downstream processing, to form high molecular weight polyamides.

Using these conventional configurations, these polymerization processes are generally able to achieve a good conversion of polyamides. In an effort to increase efficiency and decrease energy consumption during polycondensation, heat exchangers and other reactor configurations have been added and/or modified to improve the efficiency of the process. Unfortunately, these processes still require large volumes of heat transfer fluid, which causes a higher temperature change, e.g., heat flux, during polymerization. In addition, due to the high temperature change, the melted polymer further contributes to water bubble formation and steam disengagement, which detrimentally leads to excessive foaming. The conventional configurations are also known to result in undesired polymer branching, e.g., gelling.

Many conventional polymerization processes utilize a circulating shell and tube heat exchanger (with a process fluid on the tube side) in combination with a vertical reactor for carrying out the polycondensation reaction. In the heat exchanger, the process fluid that is heated is typically on the tube side, and little or no polymerization takes place. After the process fluid passes through the tubes, the heated process fluid is fed to the inlet of the vertical reactor where most polymerization occurs. Typically, the temperature of the inlet process fluid fed is too low to initiate polymerization. Thus, a substantial amount of heat must be added, e.g., via a heat transfer fluid, to initiate the polymerization reaction transfer. Recent efforts have been made to reduce the amount of temperature change in the polymerization reactor, however, a large volume of heating fluid is still necessary to increase the temperature of the process fluid to the necessary temperature. This large volume of heating fluid contributes to the drawbacks mentioned above.

As one example of a conventional process, International Application No. WO/2017120112A1 discloses a process for making a polyetheramine containing polyamide without excessive foaming in successive batches by providing a controlled heat input rate step for those batch runs that incorporate polyetheramine containing polyamide heel from previous runs.

In addition, US Publication No. 2016/0130397 discloses a process for continuously preparing polyamide oligomers. This process comprises continuous conveying of an aqueous solution of polyamide-forming monomers from a reservoir vessel into an oligomerization reactor, heating of the aqueous solution beyond a dissolution or storage temperature, and continuous discharge of the polyamide oligomers from the oligomerization reactor. The residence time of the monomer solution in the oligomerization reactor is limited and the pressure or the partial vapor pressure of the water is adjusted such that a conversion of monomers to polyamide oligomers does not exceed a maximum value and/or the polyamide oligomers formed do not phase-separate or spontaneously crystallize in solid form. A polyamide oligomer preparable by this process can be provided continuously in a mixture with water in a process for preparing a semicrystalline or amorphous, thermoplastically processible polyamide and then postcondensed to give a polyamide. This polyamide can be used for production of moldings by means of injection molding, multicomponent injection molding, injection molding/welding, extrusion, coextrusion, blow molding or thermoforming.

Also, U.S. Pat. No. 6,620,969 discloses a shell-and-tube heat exchanger for handling an easily polymerizable substance, comprising a shell having, near the opposite terminals thereof, two tube sheets respectively furnished with an inlet and an outlet for shell side fluid, channels disposed one each at the opposite terminals of said shell, and a multiplicity of heat transfer tubes having peripheries of opposite terminal parts of said heat transfer tubes fixed between said tube sheets, adapted to pass said easily polymerizable substance as a process fluid through said tubes and effect exchange of heat thereon.

Although some references may teach the use of a reactor and/or configurations that attempt to reduce foaming or the change in temperature, the need still exists for improved reaction configurations that achieve high conversions and reduce both foaming and undesired polymer branching, while having high energy efficiencies.

SUMMARY

In one embodiment, the disclosure relates to a process for preparing polyamides, the process comprising: providing an aqueous monomer solution comprising amide monomers; evaporating the aqueous monomer solution to form a concentrated monomer solution; and polymerizing the concentrated monomer solution in a (horizontal) plug flow reactor comprising a shell side and a tube side to form a first process fluid comprising polyamides. The shell side comprises an inlet and an outlet. The concentrated monomer solution flows on the shell side from the inlet to the outlet and conversion of amide monomer to polyamides may be at least 85%. The tube side may comprise a plurality of U-tubes each including an inlet and an outlet for conveying a heating fluid therethrough, and wherein the tube side has a heat transfer area, and wherein the heating fluid has a specific enthalpy, H value at atmospheric pressure, less than 2,900 kJ/kg. A ratio of the heat transfer area ($ft^2$) to a total volume ($ft^3$) of the concentrated monomer solution may range from 1:1 to 30:1, e.g., from 3:1 to 30:1 and/or a ratio of the heat transfer area ($ft^2$) to a total volume ($ft^3$) of heat transfer fluid may range from 1:1 to 200:1, e.g., from 5:1 to 200:1 and/or a heat flux rate may be less than 11400 BTU/hr-$ft^2$. The skin temperature of the plug flow reactor may be less than 290° C. A temperature change of the heat transfer fluid from the inlet to the outlet may range from 0° C. to 50° C. A residence time distribution may by +/−8%, based on an average residence time. The process may further comprise the steps of separating water from the concentrated monomer solution to form a water vapor during polymerization; supplying the water vapor to a disengagement region of the plug flow reactor, and/or flashing the first process fluid after polymerization, and the disengagement region may have a height of at least 0.05 m. In some cases, the skin temperature of the plug flow reactor is less than 290° C., the ratio of the heat transfer area to the total volume of concentrated monomer solution ranges from 3:1 to 20:1, and conversion of amide monomer to polyamides is greater than 85%. In some cases, the ratio of the heat transfer area to the volume of heat transfer fluid is greater than 80:1, a residence time of the concentrated monomer solution ranges from 50 minutes to 60 minutes, and conversion of amide monomer to polyamides is greater than 85%. In some cases the residence time of the concentrated monomer solution in the plug flow reactor ranges from 2 minutes to 100 minutes, the residence time distribution varies by +/−4%, based on an average residence time, and conversion of amide monomer to polyamides is greater than 90%. In some cases, a ratio of the heat transfer area to the volume of heating fluid ranges from 80:1 to 115:1, and the residence time distribution varies by +/−2%, based on an average residence time, and the skin temperature of the reactor is less than 290° C. In some cases, the vapor stream comprises less than $15.0\times10^{-7}$ wt % of entrained liquid, e.g., less than $3.0\times10^{-7}$ wt %. The aqueous monomer solution may comprise diacid and diamine, and a molar ratio of the diacid to the diamine may be at least 1:1, a residence time of the concentrated monomer solution may be from 2 min to 100 min, and a conversion of amide monomer to polyamides may be greater than 90%. The plug flow reactor may be operated at a temperature from 200° C. to 300° C. and/or a pressure from 13.5 bar to 18 bar and conversion of amide monomer to polyamides may be greater than 85%.

The disclosure also relates to a process for retrofitting a polycondensation process including an existing evaporator for concentrating a monomer solution and an existing reactor for forming polyamides, the process comprising: polymerizing the concentrated monomer solution in a plug flow reactor comprising a shell side and a tube side to form a first process fluid, wherein the shell side has an inlet and an outlet; feeding the first process fluid to the existing reactor; and polymerizing the first process fluid to form a second process fluid, wherein the monomer solution flows on a shell side from the inlet to the outlet. The plug flow reactor and the existing reactor may be arranged in series. The tube side may comprise a plurality of U-tubes each comprising an inlet and an outlet for conveying a heating fluid therethrough, and wherein the tube side has a heat transfer area, and wherein the heating fluid has a specific enthalpy, H value at atmospheric pressure, less than 2,900 kJ/kg. The ratio of the heat transfer area to a total volume of the concentrated monomer solution and the ratio of the heat transfer area to a total volume of heat transfer fluid are as mentioned above. The process may further comprise the steps of flashing the concentrated monomer solution to form a flashed monomer solution; and feeding the flashed monomer solution directly to the plug flow reactor. The first process fluid may comprise 85 wt. % to 92 wt. % of low molecular weight polyamides, based on the total weight of the first process fluid and/or the second process fluid may comprise 93 wt. % to 97 wt. % of high molecular weight polyamides, based on the total weight of the second process fluid.

The disclosure also relates to a system for preparing polymers, comprising: a vessel including an aqueous monomer solution; an evaporator for concentrating the aqueous monomer solution to form a concentrated monomer solution; a plug flow reactor comprising a shell side and a tube side for polymerizing the concentrated monomer solution to form polyamides, wherein the shell side comprises an inlet and an outlet, and wherein the concentrated monomer solution flows on a shell side from the inlet to the outlet. The tube side may comprise a plurality of U-tubes comprising an inlet and an outlet for conveying a heating fluid therethrough, and wherein the tube side has a heat transfer area. The system may comprise a second reactor downstream from the plug flow reactor and/or a preheater for heating the concentrated monomer solution to a temperature in a range from 180° C. to 230° C. before feeding the concentrated monomer solution to the plug flow reactor, and/or a flasher for flashing the concentrated monomer solution, and the plug flow reactor and second reactor may be arranged in series.

The disclosure also relates to a process for preparing polyamides in a plug flow reactor, the process comprising: selecting a desired first process fluid molecular weight in a range between 700 g/mol and 150,000 g/mol; providing an aqueous monomer solution comprising amide monomers; evaporating the aqueous monomer solution to form a concentrated monomer solution; polymerizing the concentrated monomer solution in a plug flow reactor comprising a shell side and a tube side to form a first process fluid comprising polyamides, controlling a heat flux rate of the process to be less than 11400 BTU/hr-ft$^2$; and maintaining a residence time of a concentrated monomer solution in the plug flow reactor from 2 minutes to 100 minutes; wherein the residence time distribution varies by +/−4%; or wherein the first process fluid molecular weight corresponds to the desired first process fluid molecular weight.

DETAILED DESCRIPTION

Introduction

Figure 1:
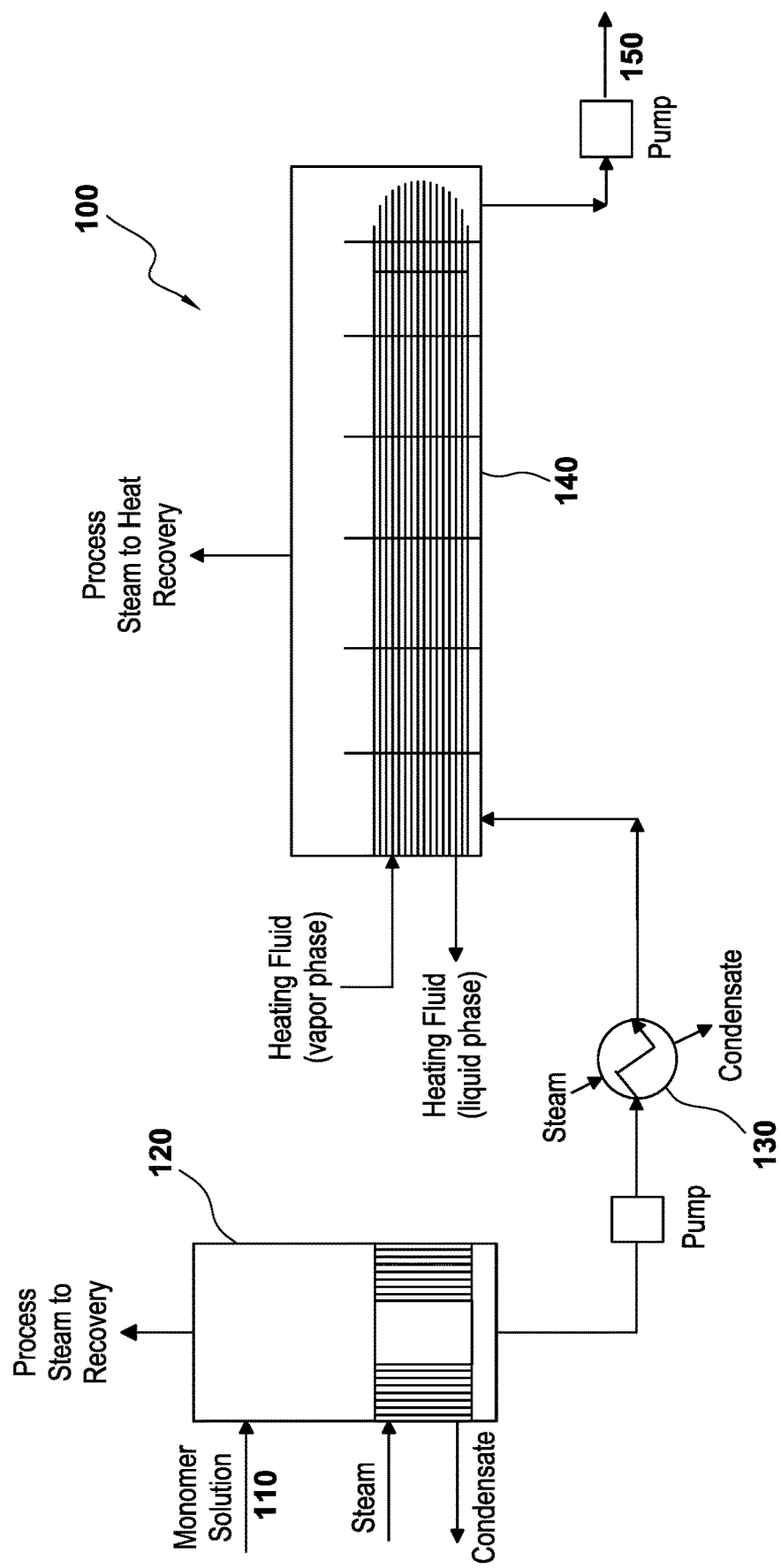
FIG. 1 is a schematic of a polymerization process with a plug flow reactor according to one embodiment of the present disclosure.

Conventional processes for producing polymers, e.g., polyamides, utilize configurations including a reservoir vessel that holds a process fluid, a conventional polymerization reactor, and further downstream processing. The process fluid is directly fed to the polymerization reactor, where polymers, e.g., polyamides, are formed. Many of these processes, relate to batch operation, where foaming is different because batch processes have different drivers that cause foaming than in continuous process, thus are more sensitive to foaming. In a batch process, the rising polymer melt viscosity complicates water bubble formation, migration to the melt surface and steam disengagement from the melt surface which also contributes to excessive foaming. For example, WO/2017120112A1 focuses exclusively on problems related to foaming in a batch process for polyamides incorporating polyetheramine. In a batch process, e.g., for making Nylon 6,6, the pressure letdown will have a higher tendency to foam than in the continuous process. Other conventional processes focus on other problems, not heat flux, foaming, or gelling. For example, U.S. Pat. No. 6,620,969 focuses on the problem of polymer fouling in a heat exchanger.

In a conventional polymerization process, a monomer solution at the pre-processing stage, known as the salt stage, may be added with other additives. The polymerization process then continues in multiple processing stages where the pressure and temperature conditions are carefully adjusted to remove the water, e.g., as steam, to produce the polymer product. The initial stages in the process contain the highest water content and consequently have a high rate of steam release. As the process continues, the water content is reduced to the residual level in the polymer product. Typically, the temperature of the inlet process is too low for polymerization. As such, a substantial amount of heat is required for polymerization of the nylon salt by charging a large volume of heat transfer fluid in the outer tube of the reactor. Stated another way, the conventional processes detrimentally require large amounts of heat transfer fluid and an accompanying high temperature change, e.g., heat flux, during polymerization. This heat flux in the reactor contributes to water bubble formation and steam disengagement, which creates problems associated with molten polymer foaming and undesired polymer branching (gelling). In addition, although these processes may provide mediocre conversion rates, there is certainly room for improvement. Also, due to the use of a direct feed from the reservoir vessel to the reactor and the large amounts of heat transfer fluid, the overall heat efficiency of these processes leaves much to be desired. Importantly, the relationship between the heat flux in the reactor and its effects on the properties of the formed polymers, foaming, gelling, and/or steam formation have not been explored or documented in the art.

It has now been discovered that by evaporating an aqueous monomer solution, prior to polymerization, to form a concentrated monomer solution and (continuously) flowing the concentrated monomer solution on the shell side of a plug flow, shell-and-tube reactor surprisingly provides for a significant drop in the overall heat flux. This unexpected decrease in heat flux advantageously leads to improvements in foaming and/or polymer branching. Without being bound by theory, it is believed that the evaporation of the aqueous monomer solution (as opposed to a direct feed from a reservoir vessel to the reactor) provides the concentrated monomer solution at a temperature and composition that is particularly suitable for polymerization, e.g., on the shell side of the polymerization reactor. It is believed that the temperature and composition of the concentrated monomer solution entering the polymerization reactor lead to a significant reduction in heat flux of the concentrated monomer solution and the heat transfer fluid, which leads to a reduction in skin temperature and reductions in the change of temperature of the heat transfer in the polymerization reactor. In addition, by flowing the specific concentrated monomer solution on the shell side, the ratio of tube side heat transfer area to total volume of the concentrated monomer solution is beneficially increased, which also contributes to less/lower heat flux. When the aforementioned configuration is utilized, not only is the heat flux (and the overall heat efficiency) decreased, but the overall conversion is synergistically improved as well.

Reaction Configuration

The present disclosure relates to processes, e.g., continuous processes, for preparing polymers utilizing an improved evaporator/reactor configuration. The processes comprise the steps of providing an aqueous monomer solution comprising amide monomers; evaporating the aqueous monomer solution to form a concentrated monomer solution; and polymerizing the concentrated monomer solution, e.g., conducting a polycondensation reaction, for example an amide polymerization reaction, to form a first process fluid comprising polyamides. As noted above, the processes utilize the evaporation step prior to the reaction step, and the reaction step employs a specific reactor configuration. The reaction is conducted in a plug flow reactor, preferably in a horizontal configuration (although a vertical and an angled configuration are contemplated) comprising a shell side and a tube side, and both the shell side and the tube side comprise an inlet and an outlet, respectively. The concentrated monomer solution is continuously fed and flows on the shell side from the shell inlet to the shell outlet. The use of the these steps and the overall configuration allow the plug flow reactor to have a high heat transfer area, which advantageously provides for, inter alia, improvements in heat flux, overall heat efficiency, and conversion as well as lower levels of skin temperatures, foaming, and branching.

In some embodiments, the heat flux rate of the process, e.g., of the reaction configuration, is less than 11400 BTU/hr-ft$^2$, e.g., less than 11000 BTU/hr-ft$^2$, less than 10000 BTU/hr-ft$^2$, less than 8000 BTU/hr-ft$^2$, less than 6000 BTU/hr-ft$^2$, less than 5000 BTU/hr-ft$^2$, less than 4000 BTU/hr-ft$^2$, less than 3000 BTU/hr-ft$^2$, less than 2000 BTU/hr-ft$^2$, or less than 1500 BTU/hr-ft$^2$. In terms of ranges, the heat flux rate of the process may range from 100 BTU/hr-ft$^2$ to 11400 BTU/hr-ft$^2$, e.g., from 100 BTU/hr-ft$^2$ to 10000 BTU/hr-ft$^2$, from 200 BTU/hr-ft$^2$ to 8000 BTU/hr-ft$^2$, from 200 BTU/hr-ft$^2$ to 6000 BTU/hr-ft$^2$, from 200 BTU/hr-ft$^2$ to 5000 BTU/hr-ft$^2$, from 200 BTU/hr-ft$^2$ to 4000 BTU/hr-ft$^2$, from 300 BTU/hr-ft$^2$ to 3000 BTU/hr-ft$^2$, or from 500 BTU/hr-ft$^2$ to 2500 BTU/hr-ft$^2$.

In one embodiment, the tube side comprises a plurality of heat transfer tubes, e.g., U-tubes, each including an inlet and an outlet for conveying a heating fluid therethrough. The U-tubes may be referred to as a tube bundle. In some embodiments, the concentrated monomer solution flows on the shell side and a heat transfer fluid flows on the tube side. The tube side, thus configured, has a heat transfer area that is in contact with the concentrated monomer solution on the shell side of the plug reactor. The heat transfer area is the interface between the plurality of U-tubes and the shell side. For example, the heat transfer area may be the total surface area of the heat transfer tubes.

In some cases, the improvements in heat flux may be reflected in a high ratio of heat transfer area to the total volume of the concentrated monomer solution. In one embodiment, the ratio of heat transfer area to the total volume of the concentrated monomer solution is greater than 1:1, e.g., greater than 3:1, greater than 5:1, greater than 7:1, greater than 10:1, greater than 12:1, greater than 15:1, or greater than 20:1. In terms of ranges, the ratio of the heat transfer area to the total volume of the concentrated monomer solution may range from 1:1 to 30:1, e.g., from 1:1 to 30:1, from 5:1 to 25:1, from 3:1 to 20:1, from 5:1 to 20:1, from 3:1 to 25:1 from 10:1 to 20:1, from 12:1 to 18:1, or from 14:1 to 17. In terms of upper limits, the ratio of heat transfer area to the volume of concentrated monomer solution is less than 30:1, e.g., less than 25:1, less than 20:1, less than 15:1, or less than 10:1.

In some embodiments the improvements in heat flux may also be reflected in the high ratio of the heat transfer area to the total volume of heat transfer fluid. In one embodiment, the ratio of heat transfer area to the total volume of heat transfer fluid is less than 200:1, e.g., less than 175:1, less than 150:1, less than 125:1, less than 120:1, less than 100:1, less than 80:1, or less than 40:1. In terms of ranges, the ratio of heat transfer area to the total volume of heat transfer fluid may range from 1:1 to 200:1, e.g., from 5:1 to 200:1, from 10:1 to 180:1, from 20:1 to 180:1, from 40:1 to 150:1, from 60:1 to 140:1, from 60:1 to 120:1, from 80:1 to 125:1, from 80:1 to 115:1, from 90:1 to 120:1 or from 100:1 to 110:1. In terms of lower limits, the ratio of heat transfer area to the total volume of heat transfer fluid is greater than 5:1, e.g., greater than 40:1, greater than 60:1, greater than 80:1, greater than 90:1, greater than 120:1, or greater than 150:1.

In some cases, the process exemplifies improvements (reductions) in nucleate boiling heat transfer coefficient. The reduction in this heat transfer coefficient complements reductions in skin temperature (see below). In some embodiments, the nucleate boiling heat transfer coefficient is less than 85 BTU/hr-ft$^2$-° F., e.g., less than 75 BTU/hr-ft$^2$-° F., less than 65 BTU/hr-ft$^2$-° F., less than 55 BTU/hr-ft$^2$-° F., less than 50 BTU/hr-ft$^2$-° F., less than 45 BTU/hr-ft$^2$-° F., less than 40 BTU/hr-ft$^2$-° F., less than 35 BTU/hr-ft$^2$-° F., less than 30 BTU/hr-ft$^2$-° F., or less than 25 BTU/hr-ft$^2$-° F. In terms of ranges, the nucleate boiling heat transfer coefficient may range from 15 BTU/hr-ft$^2$-° F. to 85 BTU/hr-ft$^2$-° F., e.g., from 15 BTU/hr-ft$^2$-° F. to 65 BTU/hr-ft$^2$-° F., from 20 BTU/hr-ft$^2$-° F. to 65 BTU/hr-ft$^2$-° F., from 25 BTU/hr-ft$^2$-° F. to 60 BTU/hr-ft$^2$-° F., from 25 BTU/hr-ft$^2$-° F. to 50 BTU/hr-ft$^2$-° F., from 30 BTU/hr-ft$^2$-° F. to 50 BTU/hr-ft$^2$-° F., or from 35 BTU/hr-ft$^2$-° F. to 45 BTU/hr-ft$^2$-° F.

Advantageously, the employment of the aforementioned steps and configuration (and optionally the aforementioned ratios) result in a lower skin temperature. As used herein, the term "skin temperature" refers to the temperature of the heat transfer surface area, e.g., the interface between heat transfer tubes and a monomer solution on the shell side. It is believed that this lower skin temperature provides for (or at least contributes to) the benefits of reducing foaming and preventing undesired polymer branching, e.g., gelling, because of the lower change in temperature of the concentrated monomer solution in the plug flow reactor. In one embodiment, the skin temperature is less than 290° C., e.g., less than 280° C., less than 270° C., less than 260° C., or less than 250° C. In terms of ranges, the skin temperature may range from 240° C. to 290° C., e.g., from 250° C. to 280° C., from 260° C. to 280° C., from 270° C. to 280° C., or from 260° C. to 270° C. In terms of lower limits, the skin temperature is greater than 240° C., e.g., greater than 250° C., greater than 260° C., greater than 270° C., or greater than 280° C.

Further, due to the ratio and/or skin temperature improvements, the heating fluid used in the process can be selected from a wide variety of heat transfer fluids, e.g., steam, organic condensing vapor, inorganic condensing vapor, or hot oil. In some embodiments, the heating fluid has a specific enthalpy, H value at atmospheric pressure, less than 2,900 kJ/kg, e.g., less than 2,700 kJ/kg, less than 2,600 kJ/kg, or less than 2,550 kJ/kg. In terms of ranges, the heating fluid has an H value (at atmospheric pressure) that may range from 2,500 kJ/kg to 2,900 kJ/kg, e.g., from 2,550 kJ/kg to 2,800 kJ/kg, from 2,600 kJ/kg to 2,700 kJ/kg, from 2,550 kJ/kg to 2,650 kJ/kg or from 2,550 kJ/kg to 2,600 kJ/kg. In terms of lower limits, the heating fluid has an H value (at atmospheric pressure) greater than 2,500 kJ/kg, e.g., greater than 2,550 kJ/kg, greater than 2,600 kJ/kg, greater than 2,700 kJ/kg, or greater than 2,800 kJ/kg. In some embodiments, the heat transfer fluid is saturated steam.

In some embodiments, the thermal conductivity of the heat transfer fluid, in a temperature range from 25° C. to 300° C., is in a range from 10 mW/m·K to 80 mW/m·K, e.g., from 20 to 70 mW/m·K, from 30 to 60 mW/m·K or from 40 to 50 mW/m·K. In terms of upper limits, the thermal conductivity of the heat transfer fluid is less than 80 mW/m·K, e.g., less than 60 mW/m·K, less than 40 mW/m·K, less than 30 mW/m·K, or less than 20 mW/m·K. In terms of the lower limits, the thermal conductivity of the heat transfer fluid is greater than 10 mW/m·K, e.g., greater than 20 mW/m·K, greater than 30 mW/m·K, greater than 40 mW/m·K, or greater than 60 mW/m·K. For example, the thermal conductivity of the heat transfer fluid at 50° C. is 20 mW/m·K, at 100° C. is 24.8 mW/m·K, at 150° C. is 30.8 mW/m·K, at 200° C. is 39.1 mW/m·K, and at 300° C. is 71.8 mW/m·K.

In some aspects, the thermal conductivity of the heat transfer fluid is in a range from 22 mW/m·K to 106 mW/m·K in a temperature range from 250° C. to 360° C. In other embodiments, the thermal conductivity of the heat transfer fluid is in a range from 88 mW/m·K to 100 mW/m·K in a temperature range from 250° C. to 360° C.

The plug flow reactor may convey a liquid or gaseous heat transfer fluid through the tubes, and the concentrated monomer solution flows on the space around the tubes on the shell side. In some embodiments, gaseous heat transfer fluids include, for example, steam or diphyl vapor. In other embodiments, liquid heat transfer fluids include, for example, a heat transfer oil. The heat transfer fluid may be fed to the plug flow reactor at a temperature in the range from 200° C. to 400° C., e.g., from 240° C. to 360° C., from 280° C. to 320° C., or from 200° C. to 250° C. In terms of upper limits, the temperature of the heat transfer fluid fed into the plug flow reactor is less than 400° C., e.g., less than 360° C., less than 320° C., less than 280° C., or less than 240° C. In terms of lower limits, the temperature of the heat transfer fluid fed into the plug flow reactor is greater than 200° C., e.g., greater than 240° C., greater than 260° C., greater than 280° C., or greater than 320° C.

The present reactor configuration also advantageously results in a lower change in temperature of the heat transfer fluid, e.g., steam. It is believed that this lower change in temperature also contributes to the benefits of reducing foaming and preventing undesired polymer branching, e.g., gelling. In one embodiment, the change in temperature of the heat transfer fluid from the inlet to the outlet of the reactor is less than 110° C., e.g., less than 80° C., less than 60° C., less than 40° C., or less than 20° C. In terms of ranges, the change in temperature of the heat transfer fluid from the inlet to the outlet of the reactor is from 0° C. to 110° C., e.g., from 10° C. to 100° C., from 20° C. to 80° C., from 40° C. to 60° C., or from 10° C. to 30° C. In terms of lower limits, the change in temperature of the heat transfer fluid from the inlet to the outlet of the reactor is greater than 0° C., e.g., greater than 10° C., greater than 20° C., greater than 30° C., or greater than 40° C.

In particular, when steam is utilized as the heat transfer fluid, a significantly lower change in temperature of the heat transfer fluid in the plug flow reactor is achieved. In one embodiment, the change in temperature of steam from the inlet to the outlet of the reactor is less than 50° C., e.g., less than 40° C., less than 30° C., less than 20° C., or less than 10° C. In terms of ranges, the change in temperature of the steam is from 0° C. to 50° C., e.g., from 5° C. to 40° C., from 10° C. to 30° C., from 15° C. to 25° C., or from 20° C. to 25° C. In terms of lower limits, the change in temperature of the heat transfer fluid is greater than 0° C., e.g., greater than 10° C., greater than 20° C., greater than 30° C., or greater than 40° C. The inventors of the present application have found that using the present reactor configuration utilizing the plug flow reactor with steam as the heat transfer fluid beneficially reduces foaming and prevents undesired polymer branching, e.g., gelling.

In conventional processes that employ lower ratios or higher skin temperatures, higher H values heating fluids (which are more expensive) must be employed, e.g., Therminol®, which results in a greater change in temperature of the heat transfer fluid and the monomer solution. Thus, the disclosed ratios, skin temperatures, and changes in temperature provide the benefit of wider heating fluid options.

During polymerization in the plug flow reactor, water is separated from, e.g., boiled off, the concentrated monomer solution to form water vapor, e.g., a vent stream, in order to form the first process fluid comprising polymers. This water vapor is conveyed to a disengagement region of the plug flow reactor to minimize liquid entrainment in the water vapor. It is believed that, in addition to the aforementioned benefits, the configurations may also provide for increased size, e.g., height and/or volume, of the disengagement region, which advantageously provides for improved entrainment-related properties For example, greater disengagement region height, has been found to beneficially contribute to reductions in foaming. The disengagement region is a closed volume within the plug flow reactor employed to devolatilize the vapor stream by separating the vapor from the liquid interface. The disengagement region separates the vapor from the liquid interface of the water vapor boiled off the first process fluid. In some cases, the disengagement region is a portion of the plug flow reactor that is not occupied by the tubes. For example, the disengagement region is an open volume of the plug flow reactor located above the plurality of tubes. Because of the greater size, e.g., height of the disengagement region, the process sees the advantage of reduced entrainment of liquid in the vapor stream resulting in less foaming.

Foaming is the formation of gas bubbles within the aqueous (liquid) monomer solution. In addition to the size/volume benefits in the disengagement region, the disclosed processes have been found to decrease foaming in the disengagement region regardless of the entrainment and/or velocity of the water vapor. It is believed that the lower heat flux and larger size of the disengagement area in the reactor contributes to this reduction.

The plug flow reactor of the present disclosure provides an improved disengagement function due to its beneficial properties mentioned above. In conventional reactors, the liquid/gas interface is adjusted by changing the reactor volume. However, controlling the interface by controlling the reactor volume is a difficult way to control the velocity of the fluids. For example, if a conventional reactor is made tall and skinny, the level control becomes difficult, vapor velocities increase with increased entrainment, and reactor costs increase with the increased surface area. On the other hand, if a conventional reactor is made short and wide, for large scale plants, shipping the reactor becomes an issue. As noted above, because of the substantially lower heat flux in the present plug flow reactor and the larger height of the disengagement region, the plug flow reactor provides for less foaming. In some embodiments, anti-foaming additives may be further added to the water vapor in the disengagement region.

In some embodiments, disengagement region of the plug flow reactor configuration has a height that contributes to improvements in the disengagement region. In some embodiments, the height of the disengagement region is the distance from the top of the tubes to the top of the shell. In one embodiment, the disengagement region has a height greater than 0.05 m, e.g., greater than 0.1 m, greater than 0.2 m, greater than 0.3 m or greater than 0.4 m. In terms of ranges, the disengagement region has a height in the range from 0.05 m to 2 m, e.g., from 0.1 m to 2.0 m, from 0.3 m to 1.8 m, from 0.1 m to 1.8 m, from 0.5 m to 1.4 m, from 0.1 m to 1.5 m, 0.1 m to 1 m, from 0.1 m to 0.5 m, from 0.15 m to 1 m, from 0.15 m to 0.5 m, from 0.2 m to 0.5 m, from 0.2 m to 0.4 m, form 0.6 m to 1.0 m, or from 0.25 m to 0.35 m. In terms of upper limits, the disengagement region has a height less than 2 m, e.g., less than 1.8 m, less than 1.5 m, less than 1 m, less than 0.5 m, less than 0.4 m, or less than 0.35 m.

In some cases, the water vapor boiled off the first process fluid (as a vent stream) has a horizontal vapor velocity of greater than 0.01 m/s, e.g., greater than 0.03 m/s, greater than 0.04 m/s, or greater than 0.05 m/s. In terms of ranges, the water vapor has a horizontal velocity in the range from 0.01 m/s to 0.08 m/s, e.g., from 0.02 m/s to 0.07 m/s, from 0.03 m/s to 0.06 m/s, or from 0.04 m/s to 0.05 m/s. In terms of upper limits, the water vapor has a horizontal velocity less than 0.08 m/s, e.g., less than 0.05 m/s, less than 0.04 m/s, or less than 0.03 m/s.

In some cases, the water vapor boiled off the first process fluid (as a vent stream) has a vertical vapor velocity of greater than 0.002 m/s, e.g., greater than 0.006 m/s, greater than 0.01 m/s, or greater than 0.015 m/s. In terms of ranges, the water vapor has a vertical velocity in the range from 0.002 m/s to 0.02 m/s, e.g., from 0.006 m/s to 0.015 m/s, from 0.008 m/s to 0.012 m/s, or from 0.01 m/s to 0.015 m/s. In terms of upper limits, the water vapor has a vertical velocity less than 0.02 m/s, e.g., less than 0.015 m/s, less than 0.01 m/s, or less than 0.008 m/s.

In some embodiments, the water vapor comprises less than $3 \times 10^{-7}$ wt % of liquid entrainment, e.g., less than $2 \times 10^{-7}$ wt % of liquid, less than $1.5 \times 10^{-7}$ wt % of liquid or less than $1 \times 10^{-7}$ wt % of liquid. The liquid entrainment may be characterized as the ratio of the mass of the liquid entrainment to the mass of the vapor stream (leaving the reactor) as a whole. In terms of ranges, the water vapor comprises liquid entrainment in the range from $1 \times 10^{-7}$ wt % to $3 \times 10^{-7}$ wt %, e.g., from $1.5 \times 10^{-7}$ wt % to $2.5 \times 10^{-7}$ wt %, from $2 \times 10^{-7}$ wt % to $3 \times 10^{-7}$ wt % or from $1.5 \times 10^{-7}$ wt % to $2 \times 10^{-7}$ wt %. In terms of lower limits, the water vapor comprises greater than $1 \times 10^{-7}$ wt % of liquid entrainment, e.g., greater than $1.5 \times 10^{-7}$ wt %, greater than $2 \times 10^{-7}$ wt %, or greater than $2.5 \times 10^{-7}$ wt %. The disclosed configuration provides for reductions in liquid entrainment content, which advantageously contribute to process efficiencies. For example the reduction in entrainment leads to less loss of product material via the vent stream. In addition, the lower entrainment levels have less environmental impact due to the lower amounts of liquid entrainment. Conventional processes have higher amounts of liquid entrainment, and as such, are less efficient. In some cases, the entrainment comprises reaction components such as hexamethylene diamine and/or low boiling cyclical compounds.

In some aspects, the larger heat transfer area provides for lower bubble density, which beneficially provides for lower liquid/vapor shear. By lowering the liquid/vapor shear (one of the contributing factors of foaming) foaming is effectively reduced. Additionally, the increased vertical height of the disengagement area provides additional time for foam to dissipate before entrainment. Therefore, although the average vertical vapor velocity may increase, the horizontal vapor velocity is lower, which in turn reduces entrainment.

In some embodiments, the liquid level inside the shell of the plug flow reactor may affect the total heat transfer area.

In some embodiments, the liquid level inside the shell of the plug flow reactor may be at least 60%, e.g., at least 60%, at least 70%, at least 75%, or at least 80%. In some embodiments, the liquid level inside the shell of the plug flow reactor may be at least 75%. By maintaining a liquid level inside the shell of the plug flow reactor, lower water vapor entrainment can be achieved.

Residence time, in particular residence time distribution, is an important parameter in the polymerization of the concentrated monomer solution. Importantly, the disclosed processes provide for improvements in residence time distribution, which is important to avoid polymer degradation. In some embodiments of the plug flow reactor, the number and cut of the baffles affects the fluid path length and zones of recirculation, which can increase the residence time. Vaporization influences the residence time by presenting additional blockage (vapor has greater specific volume than liquid) to the passage of liquid below the free surface.

The residence time, e.g., the average residence time, of the concentrated monomer solution in the plug flow reactor may be less than 100 minutes, e.g., less than 80 minutes, less than 60 minutes, less than 40 minutes or less than 20 minutes. In some cases, the residence time may range from 2 minutes to 100 minutes, e.g., from 20 minutes to 80 minutes, from 40 minutes to 60 minutes, from 50 minutes to 60 minutes, or from 55 minutes to 60 minutes. In terms of lower limits, the residence time of the concentrated monomer solution in the plug flow reactor may be greater than 2 minutes, e.g., greater than 10 minutes, greater than 20 minutes, greater than 40 minutes, greater than 50 minutes or greater than 60 minutes.

In some embodiments, the residence time distribution varies by +/−8%, based on the average residence time, e.g., +/−7%, +/−6%, +/−5%, +/−4%, +/−3%, +/−2%, +/−1%, +/−0.5%, or +/−0.25%. For example, the residence time distribution is +/−8% based on an average residence time of 46.5 minutes. In some aspects, at a confidence interval between 8% and 95%, the average residence time ranges from 46.4 minutes to 46.7 minutes.

The use of the disclosed processes provides for accompanying, synergistic improvements in conversion of amide monomer to polyamides. In some embodiments, conversion is greater than 80%, e.g., greater than 85%, greater than 90%, greater than 93%, greater than 95%, greater than 97%, greater than 99%, greater than 99.5%, or greater than 99.9%. In terms of ranges, conversion may range from 80% to 99.9%, e.g., from 85% to 99.5%, from 90% to 99%, from 93% to 97%, or from 95% to 97%. In terms of upper limits, conversion is less than 99.9%, e.g., less than 99.5%, less than 99%, less than 97%, less than 95%, less than 93% or less than 90%.

In specific embodiments, the combination of the aforementioned process steps and configuration provides for synergistic improvements in conversion.

For example, the skin temperature of the plug flow reactor may be less than 290° C., the ratio of the heat transfer area to the total volume of concentrated monomer solution is at least 25:1, which yields a conversion of amide monomer to polyamides that is greater than 85%.

As another example, the ratio of the heat transfer area to the volume of heating fluid is at least 150:1, a residence time of the concentrated monomer solution ranges from 40 min to 60 min, and conversion of amide monomer to polyamides is greater than 90%.

As another example, a residence time of the concentrated monomer solution in the plug flow reactor ranges from 50 minutes to 60 minutes, a residence time distribution varies by +/−8%, based on an average residence time, and conversion of amide monomer to polyamides is greater than 85%.

As another example, a ratio of the heat transfer area to the volume of heating fluid is in a range from 1:1 to 200:1, the residence time distribution varies by +/−8%, based on an average residence time, the skin temperature of the reactor is less than 260° C., and the heating fluid has an H value less than 2800 kJ/kg.

As another example, the aqueous monomer solution comprises diacid and diamine at a molar ratio of the diacid to the diamine is at least 1:1, and a residence time of the concentrated monomer solution is from 55 minutes to 60 minutes, and a conversion of amide monomer to polyamides is greater than 85%.

In some embodiments, the plug flow reactor is operated at (constant or substantially constant) pressure ranging from 13.5 bar to 18.5 bar, e.g., from 14 bar to 18 bar, from 14 bar to 17 bar, or from 15 bar to 16 bar. In terms of upper limits, the plug flow reactor is operated at a pressure less than 18.5 bar, e.g., less than 18 bar, less than 17 bar, less than 16 bar, less than 15 bar, or less than 14 bar. In terms of lower limits, plug flow reactor is operated at a pressure greater than 13.5 bar, e.g., greater than 14 bar, greater than 15 bar, greater than 16 bar, greater than 17 bar, or greater than 18 bar.

In addition, the disclosed processes provide for a lower change in temperature for the concentrated monomer solution from the inlet of the plug flow reactor to the outlet of the plug flow reactor. In some cases, the temperature change of the first process fluid from the inlet of the plug flow reactor to the outlet of the plug flow reactor ranges from 0° C. to 150° C., e.g., from 25° C. to 150° C., from 25° C. to 125° C., from 50° C. to 100° C., or from 60° C. to 80° C. In terms of upper limits, the change in temperature is less than 150° C., e.g., less than 125° C., less than 100° C., less than 80° C., less than 60° C., less than 50° C. or less than 25° C. In terms of lower limits, the change in temperature is greater than 0° C., e.g., greater than 25° C., greater than 50° C., greater than 60° C., greater than 80° C., greater than 100° C. or greater than 125° C.

In some embodiments, the plug flow reactor heats the concentrated monomer solution to a temperature ranging from 200° C. to 300° C., e.g., from 210° C. to 290° C., from 220° C. to 280° C., from 230° C. to 270° C., from 240° C. to 270° C., from 235° C. to 255° C., or from 250° C. to 260° C. In terms of upper limits, the plug flow reactor heats the concentrated monomer solution to a temperature less than 300° C., e.g., less than 280° C., less than 260° C., less than 250° C., less than 240° C., less than 220° C. or less than 210° C. In terms of lower limits, plug flow reactor heats the concentrated monomer solution to a temperature greater than 200° C., e.g., greater than 210° C., greater than 220° C., greater than 240° C., greater than 250° C., greater than 260° C. or greater than 280° C.

In a particular embodiment, the plug flow reactor is operated at a temperature from 200° C. to 300° C., and the pressure is from 14 bar to 18 bar, and conversion of amide monomer to polyamides is greater than 95%.

FIG. 1 shows a continuous polymerization process with a plug flow reactor according to one embodiment of the present disclosure. Process 100 includes feeding stage 110. In feeding stage 110, aqueous monomer solution comprising amide monomers is fed directly from a feed tank to evaporation stage 120. The feed tank may be upstream of the evaporator. Evaporation stage 120 evaporates the aqueous monomer solution to form a concentrated monomer solution, e.g., a monomer solution with a lower water content than the aqueous monomer solution.

In some embodiments, the aqueous monomer solution comprises diacid and diamine. The molar ratio of the diacid to the diamine in the aqueous monomer solution may be at least 1:1. In one embodiment, the ratio of diacid to the diamine in the aqueous monomer solution is less than 8:1, e.g., less than 6:1, less than 4:1, less than 2:1, or less than 1:1. In terms of ranges, the ratio of diacid to the diamine in the aqueous monomer solution may range from 1:2 to 8:1, e.g., from 1:1 to 6:1, or from 2:1 to 4:1. In terms of lower limits, the ratio of diacid to the diamine in the aqueous monomer solution is greater than 1:2, e.g., greater than 1:1, greater than 2:1, or greater than 4:1.

In some embodiments, the concentration of amide monomers in the aqueous monomer solution is in a range from 50 wt % to 80 wt %, based on the total weight of the aqueous monomer solution, e.g., from 55 wt % to 75 wt % or from 60 wt % to 70 wt %. In terms of upper limits, the concentration of amide monomers in the aqueous monomer solution is less than 80 wt %, e.g., less than 75 wt %, less than 70 wt %, less than 60 wt %, or less than 55 wt %. In terms of lower limits, the concentration of amide monomers in the aqueous monomer solution is greater than 50 wt %, e.g., greater than 55 wt %, greater than 60 wt %, greater than 70 wt %, or greater than 75 wt %. The balance of the aqueous monomer solution comprises water and/or additional additives. In some embodiments, the amide monomers comprises a diacid and a diamine, i.e., nylon salt.

After evaporation stage 120, the concentrated monomer solution comprises amide monomers in a range from 60 to 95%, based on the total weight of the concentrated monomer solution, e.g., from 65% to 90%, from 70% to 85%, or from 75% to 80%. In terms of upper limits, the concentration of amide monomers in the concentrated monomer solution is less than 95 wt %, e.g., less than 90 wt %, less than 80 wt %, less than 70 wt %, or less than 65 wt %. In terms of lower limits, the concentration of amide monomers in the concentrated monomer solution is greater than 60 wt %, e.g., greater than 65 wt %, greater than 70 wt %, greater than 80 wt %, or greater than 90 wt %.

The concentrated monomer solution may exit the evaporator at a temperature in a range from 100° C. to 200° C., e.g., from 110° C. to 190° C., from 120° C. to 180° C., from 130° C. to 170° C., from 140 to 160° C., or from 145° C. to 155° C. In terms of upper limits, the concentrated monomer solution exits the evaporator at a temperature less than 200° C., e.g., less than 180° C., less than 160° C., less than 140° C., less than 120° C., or less than 110° C. In terms of lower limits, concentrated monomer solution exits the evaporator at a temperature greater than 100° C., e.g., greater than 120° C., greater than 140° C., greater than 160° C., greater than 170° C., greater than 180° C. or greater than 190° C. Preferably, the evaporator is operated in a temperature range such that no conversion of the concentrated monomer solution to polymers occurs in the evaporator. The combination of the evaporator and the plug flow reactor provides a synergistic effect that leads to greater conversion. For example, the evaporator allows for the reduced change in temperature of both the heat transfer fluid and the concentrated monomer solution in the plug flow reactor. This also enables the plug flow reactor to use less heat transfer fluid and operate at lower temperatures than in conventional processes.

In some embodiments, the aqueous monomer solution is a nylon salt solution. The nylon salt solution may be formed by mixing a diamine and a diacid with water. For example, water, diamine, and dicarboxylic acid monomer are mixed to form a salt solution, e.g., mixing adipic acid and hexamethylene diamine with water. In some embodiments, the diacid may be a dicarboxylic acid and may be selected from the group consisting of oxalic acid, malonic acid, succinic acid, glutaric acid, pimelic acid, adipic acid, suberic acid, azelaic acid, sebacic acid, undecanedioic acid, dodecandioic acid, maleic acid, glutaconic acid, traumatic acid, and muconic acid, 1,2- or 1,3-cyclohexane dicarboxylic acids, 1,2- or 1,3-phenyl enediacetic acids, 1,2- or 1,3-cyclohexane diacetic acids, isophthalic acid, terephthalic acid, 4,4'-oxybisbenzoic acid, 4,4-benzophenone dicarboxylic acid, 2,6-napthalene dicarboxylic acid, p-t-butyl isophthalic acid and 2,5-furandicarboxylic acid, and mixtures thereof. In some embodiments, the diamine may be selected from the group consisting of ethanol diamine, trimethylene diamine, putrescine, cadaverine, hexamethyelene diamine, 2-methyl pentamethylene diamine, heptamethylene diamine, 2-methyl hexamethylene diamine, 3-methyl hexamethylene diamine, 2,2-dimethyl pentamethylene diamine, octamethylene diamine, 2,5-dimethyl hexamethylene diamine, nonamethylene diamine, 2,2,4- and 2,4,4-trimethyl hexamethylene diamines, decamethylene diamine, 5-methylnonane diamine, isophorone diamine, undecamethylene diamine, dodecamethylene diamine, 2,2,7,7-tetramethyl octamethylene diamine, bis(p-aminocyclohexyl)methane, bis(aminomethyl)norbornane, C2-C16 aliphatic diamine optionally substituted with one or more C1 to C4 alkyl groups, aliphatic polyether diamines and furanic diamines, such as 2,5-bis (aminomethyl)furan, and mixtures thereof. In preferred embodiments, the diacid is adipic acid and the diamine is hexamethylene diamine which are polymerized to form nylon 6,6.

It should be understood that the concept of producing a polyamide from diamines and diacids also encompasses the concept of other suitable monomers, such as, aminoacids or lactams. Without limiting the scope, examples of aminoacids can include 6-aminohaxanoic acid, 7-aminoheptanoic acid, 11-aminoundecanoic acid, 12-aminododecanoic acid, or combinations thereof. Without limiting the scope of the disclosure, examples of lactams can include caprolactam, enantholactam, lauryllactam, or combinations thereof. Suitable feeds for the disclosed process can include mixtures of diamines, diacids, aminoacids and lactams.

Of course, polyamides are only one type of polymer that may be utilized in the disclosed process. And other polymerization reactants/reactions are contemplated.

Process 100 may optionally include preheating stage 130 after evaporation stage 120. The concentrated monomer solution may be pumped to preheating stage 130 via a pump. In the preheating stage 130, the preheater may heat the concentrated monomer solution to a temperature in the range from 180° C. to 230° C., e.g., from 190° C. to 220° C., from 200° C. to 210° C., or from 205 to 215° C. In terms of lower limits, concentrated monomer solution exits the preheater at a temperature greater than 180° C., e.g., greater than 190° C., greater than 200° C., greater than 210° C. or greater than 220° C. In terms of upper limits, the concentrated monomer solution exits the preheater at a temperature less than 230° C., e.g., less than 220° C., less than 210° C., less than 200° C. or less than 190° C. Preferably, the preheater is operated in a temperature range such that no conversion of the concentrated monomer solution to polymers occurs in the preheater. By introducing the concentrated monomer solution to a polymerization reactor at a higher temperature, heat flux in the plug flow reactor may be reduced even further.

After optional pre-heating stage 130, the concentrated aqueous monomer solution is fed to polymerization stage 140 to convert at least a portion of the monomer solution to a polymer, e.g., to polyamide. In some embodiments, polymerization stage 140 comprises (directly) feeding the concentrated monomer solution from evaporation stage 120 to polymerization stage 140. Polymerization stage 140 polymerizes the concentrated monomer solution to form a first process fluid comprising polyamides.

During polymerization in polymerization stage 140, water is boiled off the first process fluid to form water vapor. The water vapor is supplied to a disengagement region of polymerization stage 140 to minimize liquid entrainment in the water vapor. Entrainment is the escape of liquid droplets in the water vapor. In addition to the vapor velocity, entrainment is affected by droplet diameter, liquid and vapor densities, surface tension and vertical disengagement height.

In polymerization processes utilizing a preheater, the inlet temperature of the concentrated monomer solution in the plug flow reactor may be higher than in embodiments where the concentrated monomer solution is directly fed to the plug flow reactor from the evaporator. In these embodiments, the temperature change of the concentrated monomer solution from the inlet of the plug flow reactor to the outlet of the plug flow reactor is in a range from 0° C. to 50° C., e.g., from 5° C. to 45° C., from 15° C. to 35° C., or from 20° C. to 30° C. The plug flow reactor is preferably operated at constant pressure. During the polymerization reaction in the plug flow reactor, water of polymerization is devolatilized and exits the plug flow reactor in a separate stream.

Figure 2:
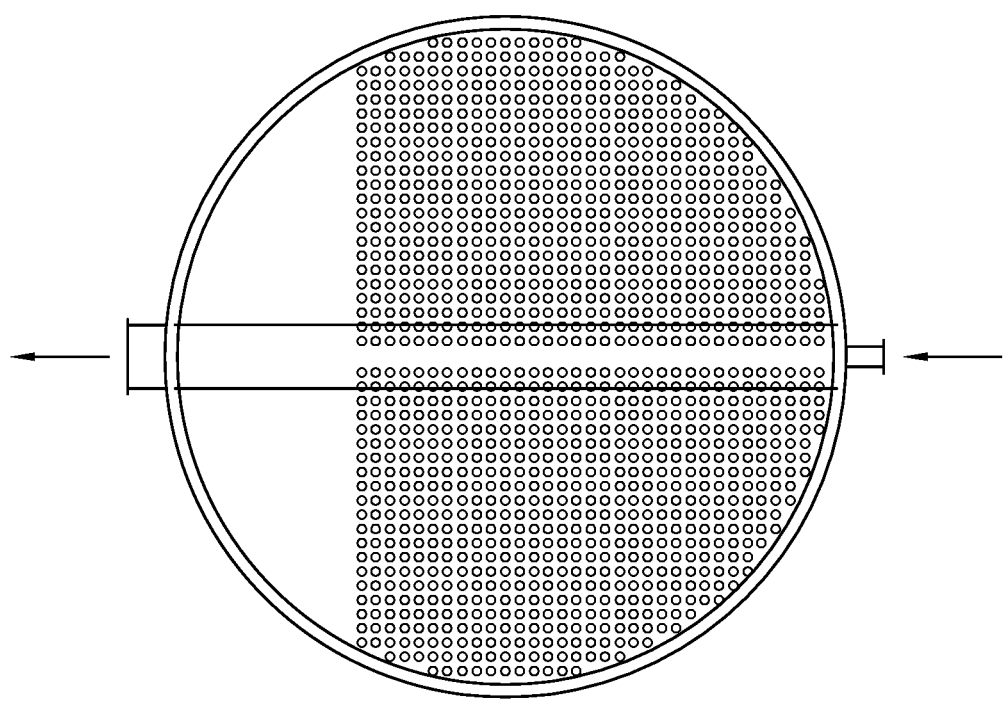
FIG. 2 shows a tube layout of a plug flow reactor according to one embodiment of the present disclosure.

The plug flow reactor may have a tube layout as shown in FIG. 2 according to one embodiment of the present disclosure. As noted above, in some embodiments, the plug flow reactor comprises a number of tubes (in a bundle), e.g., U-tubes, from 400 to 1,600 tubes, e.g., from 500 to 1,500 tubes, from 600 to 1,200 tubes, or from 800 to 1000. In terms of upper limits, the number of tubes is less than 1,600 tubes, e.g., less than 1,400 tubes, less than 1,200 tubes, less than 1,000 tubes, or less than 800 tubes. In terms of lower limits, the number of tubes is greater than 400 tubes, e.g., greater than 600 tubes, greater than 800, greater than 1,000 tubes, greater than 1,200 tubes, or greater than 1,400 tubes.

The outer diameter of the tubes may be in the range from 6 mm to 32 mm, e.g, from 10 mm to 28 mm, from 14 mm to 24 mm, from 16 mm to 22 mm or from 18 mm to 20 mm. In terms of lower limits, the outer diameter of the tubes may be greater than 6 mm, e.g., greater than 10 mm, greater than 16 mm, greater than 20 mm, greater than 24 mm, or greater than 28 mm. In terms of upper limits, outer diameter of the tubes may be less than 32 mm, e.g., less than 28 mm, less than 24 mm, less than 20 mm, less than 16 mm, or less than 12 mm.

The length of each of the tubes may be in the range from 2 m to 10 m, e.g, from 4 m to 8 m, from 5 m to 7 m, or from 6 m to 7 m. In terms of lower limits, the length of each of the tubes may be greater than 2 m, e.g., greater than 4 m, greater than 6 m, or greater than 8 m. In terms of upper limits, the length of each of the tubes may be than less than 10 m, e.g., less than 8 m, less than 6 m, or less than 4 m.

In some embodiments, the volume of the total displacement of the tubes is greater than 1 $m^3$, e.g., greater than 2 $m^3$, greater than 3 $m^3$, greater than 4 $m^3$, or greater than 5 $m^3$. In terms of ranges, the volume of the total displacement of the tubes is in the range from 1 $m^3$ to 6 $m^3$, e.g., from 2 $m^3$ to 5 $m^3$, from 3 $m^3$ to 4 $m^3$, or from 2 $m^3$ to 2.5 $m^3$. In terms of upper limits, the volume of the total displacement of the tubes is less than 6 $m^3$, e.g., less than 5 $m^3$, less than 4 $m^3$, less than 3 $m^3$, or less than 2 $m^3$.

In some embodiments, the plug flow reactor may include a shell having an inner diameter in the range from 1 m to 10 m, e.g, from 2 m to 8 m, from 4 m to 6 m or from 1 m to 2 m. In terms of lower limits, the shell may have an inner diameter greater than 1 m, e.g., greater than 2 m, greater than 4 m or greater than 6 m. In terms of upper limits, the shell may have an inner diameter less than 10 m, e.g., less than 8 m, less than 6 m or less than 4 m.

In some embodiments, the cross-sectional area of the shell covering the tubes may be greater than 0.5 $m^2$, e.g., greater than 1 $m^2$, greater than 1.5 $m^2$, greater than 2 $m^2$, or greater than 2.5 $m^2$. In terms of ranges, the cross-sectional area of the shell covering the tubes may be in the range from 0.5 $m^2$ to 3 $m^2$, e.g., from 0.8 $m^2$ to 2.6 $m^2$, from 1 $m^2$ to 2.2 $m^2$ or from 1.5 $m^2$ to 2 $m^2$. In terms of upper limits, the cross-sectional area of the shell covering the tubes may be less than 3 $m^2$, e.g., less than 2.5 $m^2$, less than 2 $m^2$, less than 1.5 $m^2$, or less than 1 $m^2$.

In some embodiments, the volume of the shell covering the tubes may be greater than 5 $m^3$, e.g., greater than 7 $m^3$, greater than 9 $m^3$, greater than 11 $m^3$, or greater than 13 $m^3$. In terms of ranges, the volume of the shell covering the tubes may be in the range from 5 $m^3$ to 15 $m^3$, e.g., from 7 $m^3$ to 13 $m^3$, from 9 $m^3$ to 11 $m^3$ or from 10 $m^3$ to 10.5 $m^3$. In terms of upper limits, the volume of the of the shell covering the tubes may be less than 15 $m^3$, e.g., less than 13 $m^3$, less than 11 $m^3$, less than 9 $m^3$, or less than 7 $m^3$.

In some embodiments, the heat transfer area of the plug flow reactor may be greater than 200 $m^2$, e.g., greater than 400 $m^2$, greater than 500 $m^2$, greater than 600 $m^2$, or greater than 800 $m^2$. In terms of ranges, the heat transfer area of the plug flow reactor may be in the range from 200 $m^2$ to 1,000 $m^2$, e.g., from 300 $m^2$ to 900 $m^2$, from 400 $m^2$ to 800 $m^2$ or from 500 $m^2$ to 700 $m^2$. In terms of upper limits, the heat transfer area of the plug flow reactor may be less than 1,000 $m^2$, e.g., less than 800 $m^2$, less than 600 $m^2$, less than 500 $m^2$ or less than 400 $m^2$.

The plug flow reactor may have a tube layout as shown in FIG. 2 according to one embodiment of the present disclosure. In this embodiment, the plug flow reactor has a BEU exchanger design as designated by the Tubular Exchanger Manufactures Association (TEMA). The plug flow reactor may comprise an E-type shell with U-tube bundles supported by vertical segmental baffles. In some aspects, the plug flow reactor may include stationary front head, i.e., a bonnet.

In some embodiments, the plug flow reactor may be a one pass, two pass, or four pass design on the tube side. The term "pass" refers to the number of times the heat transfer fluid passes through the process fluid in the plug flow reactor. Preferably, the tube side of the plug flow reactor is a two pass system that allows the heat transfer fluid to pass the fluid in the shell, e.g., concentrated monomer solution or process fluid, two times. For example, in a two pass system, the first pass and the second pass may each include 22 rows of tubes, wherein each pass has 617 tubes. In some embodiments, the tube layout angle may be 90° with respect to the reactor. In some aspects, the plurality or bundle of tubes, e.g., U-tubes or straight tubes, utilized in the plug flow reactor may be a one pass, two pass, or four pass design.

In one embodiment, the plug flow reactor comprises a single TEMA E-type shell that utilizes ¾ inch U-tubes with a 90° tube layout. The U-tube bundle may be utilized in a 20 foot or 40 foot bundle. The plug flow reactor may further include one or more single segmental baffles with 45% vertical cut to provide tube support and promote serpentine flow for mixing. During operation, the liquid level inside the shell of the plug flow reactor may be about 75%.

Referring back to FIG. 1, in some embodiments, process 100 may optionally include second polymerization stage 150 downstream from first polymerization stage 140. In second polymerization stage 150, the first process fluid is pumped from first polymerization stage 140 to a second polymerization stage 150. The second polymerization stage 150 further polymerizes the first process fluid to form a second process fluid. In some embodiments, first polymerization stage 140 produces low molecular weight polyamides which are fed to second polymerization stage 150 to produce higher molecular weight polyamides. The second process fluid exiting the second reactor may be pumped downstream for further processing, e.g., flashing, finishing, drying, etc, to obtain a finished polymer product.

In another aspect, the system may further include a flasher. The concentrated monomer solution may be fed from the evaporator, optionally to the pre-heater, and then to a flasher before polymerization in the plug flow reactor. The flasher flashes the concentrated monomer solution before entering the plug flow reactor. In some embodiments, the concentrated monomer solution is flashed in a flash pot.

Retrofitting an Existing Polymerization Process

The benefits of the process disclosed above may also be employed to retrofit an existing process. Also disclosed herein is a process for retrofitting a polycondensation process that already includes an existing evaporator and an existing reactor for preparing polyamides. The process comprises the steps of polymerizing the monomer solution in a first reactor, e.g., a plug flow reactor as described above, to form a first process fluid, feeding the first process fluid to the existing reactor; and polymerizing the first process fluid to form a second process fluid. The concentrated monomer solution flows on a shell side from the inlet to the outlet. In this process, the evaporator and plug flow reactor configuration has the same features discussed above and provides for the same benefits.

In some embodiments, the retrofit reactor configuration may utilize the plug flow reactor with the existing reactor, or the plug flow reactor may entirely replace the existing reactor. As described above, the plug flow reactor is a shell and tube plug flow reactor including a shell having a shell side and a bundle of tubes having a tube side arranged within a shell. The heat transfer flow flows on the tube side and the monomer solution flows on the shell side. In some embodiments, the plug flow reactor is a horizontal tubular reactor.

Figure 3:
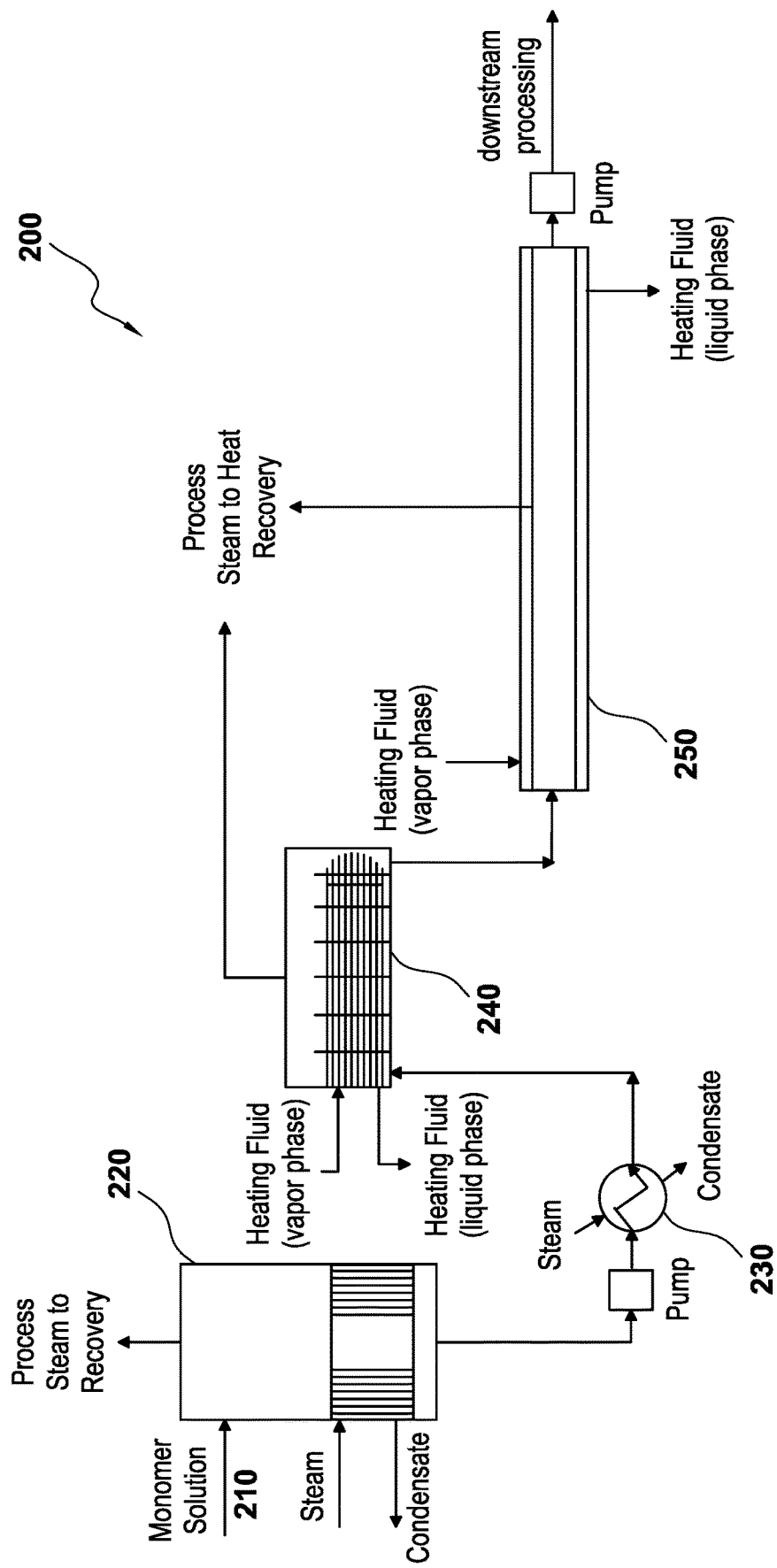
FIG. 3 is a schematic of a process for retrofitting an existing polymerization process with the plug flow reactor according to one embodiment of the present disclosure

FIG. 3 shows a polymerization process retrofit with a plug flow reactor according to one embodiment. In an existing polymerization process, process 200 includes existing evaporation stage 220 for concentrating a monomer solution from feeding stage 210 and an existing polymerization stage 250, e.g., a polymerization reactor, for forming polymers.

In some embodiments, the polymerization process 200 may optionally include a preheating stage 230 downstream from the evaporation stage 220. After evaporation stage 220, the concentrated monomer solution may be pumped to preheating stage 230. The preheating stage 230 may heat the concentrated monomer solution to a temperature in the range from 180° C. to 230° C., e.g., from 190° C. to 220° C., from 200° C. to 210° C., or from 205 to 215° C., before being introduced to the first polymerization stage 240, which is a plug flow reactor 240 retrofit in the existing polymerization process 200. In terms of lower limits, the preheating stage 230 heats the concentrated monomer solution to a temperature greater than 180° C., e.g., greater than 190° C., greater than 200° C., greater than 210° C. or greater than 220° C. In terms of upper limits, the preheating stage 230 heats the concentrated monomer solution to a temperature less than 230° C., e.g., less than 220° C., less than 210° C., less than 200° C. or less than 190° C.

The plug flow reactor in the first polymerization stage 240 may be retrofit upstream from the existing polymerization stage 250. The plug flow reactor includes a shell side having an inlet and an outlet, and a tube side including a bundle of tubes having a heat transfer area. The concentrated polymer solution flows on the shell side of the plug flow reactor to initially polymerize the concentrated monomer solution from the evaporator to form a first process fluid. In some embodiments, the first process fluid comprises low molecular weight polyamides and some water, e.g., water of polymerization and solution water, that exits the plug flow reactor. The concentration of the low molecular weight polyamides that exits the plug flow reactor is in a range from 70% to 99.9%, e.g., from 75% to 95%, from 80% to 95%, from 80% to 90%, from 85% to 95%, or from 90% to 95%. In some embodiments, the concentration of the low molecular weight polyamides exiting the plug flow reactor in the first polymerization stage 240 is 92%. The first process fluid is fed downstream to existing polymerization stage 250 for polymerizing the first process fluid to form a second process fluid comprising high molecular weight polyamides.

The existing polymerization stage 250 may include an existing reactor comprising an outer tube for a conveying heating fluid therethrough and an inner tube for conveying the first process fluid. The outer tube conveys a volume of heat transfer fluid to heat the first process fluid to temperature in the range from 200° C. to 300° C., e.g., from 210° C. to 290° C., from 220° C. to 280° C., from 230° C. to 270° C., from 240° C. to 270° C., from 245° C. to 265° C., or from 250° C. to 260° C. The existing polymerization reactor 250 is operated at constant pressure in the range from 13.5 bar to 18 bar, e.g., 14 bar to 17 bar or 15 bar to 16 bar.

In some embodiments, the plug flow reactor and the existing reactor are used in series. In some embodiments, the plug flow reactor and the existing reactor are used in parallel. In some aspects, the plug flow reactor is located before the existing reactor. In some aspects, the plug flow reactor is located after the existing reactor. As mentioned above, in some embodiments, the plug flow reactor can entirely replace an existing reactor.

In one aspect, the first process fluid comprises 85 wt. % to 92 wt. % of low molecular weight polyamides, based on the total weight of the first process fluid and the second process fluid comprises 93 wt. % to 97 wt. % of high molecular weight polyamides, based on the total weight of the second process fluid. The polymerization may include further conventional downstream processing steps to obtain the finished polymer product.

In some aspects, the low molecular weight polyamides have a molecular weight greater than 500 g/mol, e.g. greater than 700 g/mol, greater than 900 g/mol, greater than 1,200 g/mol or greater than 1,600 g/mol. In terms of ranges, the low molecular weight polyamides have a molecular weight in the range from 500 g/mol to 1,800 g/mol, e.g., from 600 g/mol to 1,600 g/mol, from 800 g/mol to 1,400 g/mol, or from 1,000 g/mol to 1,200 g/mol. In terms of upper limits, the low molecular weight polyamides have a molecular weight less than 1,800 g/mol, e.g., less than 1,600 g/mol, less than 1,200 g/mol, or less than 800 g/mol.

In other aspects, the high molecular weight polyamides have a molecular weight greater than 2,000 g/mol, e.g. greater than 5,000 g/mol, greater than 20,000 g/mol, greater than 50,000 g/mol, or greater than 100,000 g/mol. In terms of ranges, the high molecular weight polyamides have a molecular weight in the range from 2,000 g/mol to 125,000 g/mol, e.g., from 5,000 g/mol to 100,000 g/mol, from 20,000 g/mol to 80,000 g/mol, or from 50,000 g/mol to 80,000 g/mol. In terms of upper limits, the high molecular weight polyamides have a molecular weight less than 150,000 g/mol, e.g., less than 120,000 g/mol, less than 100,000 g/mol, or less than 50,000 g/mol.

In another embodiment, a system for preparing polymers is provided. The system includes a vessel, an evaporator, and a plug flow reactor. The vessel includes an aqueous monomer solution. During polymerization, the vessel continuously feeds the aqueous monomer solution to the evaporator. The aqueous monomer solution is concentrated in the evaporator to provide a concentrated monomer solution in the ranges disclosed above. The concentrated monomer solution is then fed to a plug flow reactor comprising a shell side and a tube side for polymerizing the concentrated monomer solution to form polyamides. The concentrated monomer solution flows on a shell side from the inlet to the outlet of the plug flow reactor to form polymers. The tube side of the plug flow reactor comprises a plurality of U-tubes comprising an inlet and an outlet for conveying a heating fluid therethrough. The tube side has a high heat transfer area. In one aspect, the system may further include a second reactor downstream from the plug flow reactor that is arranged in series with the plug flow reactor.

EXAMPLES

Example 1

A polyamide production process, as disclosed herein, was simulated using HTRI modeling software. An evaporation unit followed by a plug flow reactor (with a shell side and a tube side) was simulated. The reactor comprised a 24 feet long shell that was 62 inches diameter and contained 617 U-tubes, each 20 feet in length and 0.75 inches diameter. The concentrated monomer solution flowed on the shell side from the inlet to the outlet. The concentrated monomer solution (processing salt solution) had a concentration ranging from 78 wt % (in) to 95 wt % (out) and was fed at a rate of 23,491 lb/hr. The reactor was operated at a simulated pressure of 245 psig and a simulated process bulk fluid temperature ranging of 210° C. (inlet) to 250° C. (outlet). The heating fluid temperature was 254° C.

Example 2

Another polyamide production process, as disclosed herein, was simulated using HTRI modeling software. An evaporation unit followed by a plug flow reactor (with a shell side and a tube side) was simulated. The reactor comprised a 21 feet long shell that was 48 inches diameter and contained 405 U-tubes, each approximately 16 feet in length and 0.75 inches diameter. The concentrated monomer solution flowed on the shell side from the inlet to the outlet. The concentrated monomer solution (processing salt solution) had a concentration ranging from 78 wt % (in) to 95 wt % (out) and was fed at a rate of 10,410 lb/hr. The reactor was operated at a simulated pressure of 245 psig and a simulated process bulk fluid temperature ranging of 210° C. (inlet) to 250° C. (outlet). The heating fluid temperature was 254° C.

Example 3

Another polyamide production process, as disclosed herein, was simulated using HTRI modeling software. An evaporation unit followed by a plug flow reactor (with a shell side and a tube side) was simulated. The reactor comprised a 20 feet long shell that was 52 inches diameter and contained 281 U-tubes, each approximately 15 feet in length and 0.75 inches diameter. The concentrated monomer solution flowed on the shell side from the inlet to the outlet. The concentrated monomer solution (processing salt solution) had a concentration ranging from 70 wt % (in) to 85 wt % (out) and was fed at a rate of 15,000 lb/hr. The reactor was operated at a simulated pressure of 245 psig and a simulated process bulk fluid temperature ranging of 193° C. (inlet) to 226° C. (outlet). The heating fluid temperature was 259° C.

Heat flux rate, nucleate boiling heat transfer coefficient, skin temperature, residence time variation, and liquid entrainment in the vent stream were measured. The results are shown in Table 1.

Comparative Example A

Polyamide was produced using a conventional polyamide production process (not a simulation) with a plug flow reactor comprising a shell and a heating jacket on the outside of the shell. The reactor comprised a 197 feet long shell that was 17.4 inches diameter and contained a single tube (having a 17.4 inch diameter). The tube side comprised an inlet and an outlet and the concentrated monomer solution (processing salt solution) flowed on the tube side from the inlet to the outlet. The concentrated monomer solution had a concentration ranging from 78 wt % (in) to 95 wt % (out) and was fed at a rate of 23,491 lb/hr. The reactor was operated at a pressure of 245 psig and a process bulk fluid temperature ranging of 210° C. (inlet) to 250° C. (outlet). The reactor was heated with jacketed with Therminol vapor heating fluid at a temperature ranging from 305° C. to 323° C. (higher than the simulated examples).

Heat flux rate, nucleate boiling heat transfer coefficient, skin temperature, residence time variation, and liquid entrainment in the vent stream were measured. The results are shown in Table 1.

TABLE 1

| Simulation Performance Parameters | | | | |
|---|---|---|---|---|
| Parameter | Example 1 | Example 2 | Example 3 | Comp. Ex. A |
| Heat flux rate, BTU/hr-ft$^2$ | 1,472 | 1,280 | 2,248 | 11,491 |
| Nucleate boiling heat transfer coefficient, BTU/hr-ft$^2$-° F. | 30 to 49 | 29 to 54 | 30 to 54 | 85 to 150 |
| Skin temperature, ° C. | 219 to 288 | 215 to 288 | 205 to 261 | 243 to 310 |
| Residence time variation (+/−%) | 0.4% | 0.55% | — | 8.1% |
| Liquid entrainment in vent stream, wt %* | $2.57 \times 10^{-7}$ | $1.34 \times 10^{-7}$ | $4.8 \times 10^{-7}$ | $15.5 \times 10^{-7}$ |
| Height, inches | 17.5 | 14.25 | 13 | 4.3 |
| Ratio 1* 1:1 to 30:1 | 17.5 | 15.3 | 7.2 | 2.2 |

TABLE 1-continued

Simulation Performance Parameters

| Parameter | Example 1 | Example 2 | Example 3 | Comp. Ex. A |
|---|---|---|---|---|
| Ratio 2** 1:1 to 200:1 | 112.5 | 112.3 | 106.4 | 4.1 |
| Conversion | 90%+ | 90%+ | 90%+ | 90%+ |

*Ratio 1 is the ratio of the heat transfer area ($ft^2$) to a total volume ($ft^3$) of the concentrated monomer solution
**Ratio 2 is the ratio of the heat transfer area ($ft^2$) to a total volume ($ft^3$) of heat transfer fluid As shown in Table 1, by flowing the concentrated monomer solution on the shell side from the inlet to the outlet and employing other disclosed process parameters, the disclosed process surprisingly achieved a significantly lower heat flux rate, as compared to that achieved via a conventional process. Advantageously, this reduction in heat flux rate provided for the processing improvements, e.g., reductions, in temperature and temperature deltas during operation, as well as reductions in detrimental foaming.

Also, residence time variation was greatly improved (±0.4% and ±0.55% vs.±8.1%), which in turn provided for higher reactor conversion (at an equivalent average residence time). With tighter distributions, there was beneficially less time for the material to degrade. In contrast with conventional processes that operate with much greater residence time variations, material is allowed to remain and degrade, which creates process inefficiencies, e.g., reductions in conversion. Further, the tighter residence time variations beneficially inhibit any back-mixing that may occur, which also contributes to higher overall conversion.

Importantly, the skin temperature of the disclosed process was significantly decreased, which contributes to, inter alia, reductions in foaming and preventing undesired polymer branching, e.g., gelling. In addition, the nucleate boiling heat transfer coefficients were lowered significantly, as compared to Comparative Example A. And these reductions heat transfer coefficient synergistically complemented the reductions in skin temperature.

Further, the Examples clearly demonstrate that the disclosed configurations provide for notable improvements in liquid entrainment, e.g., in vent stream. This improvement is beneficial because it contributes to less loss of product material via the vent stream and less environmental impact due to the lower amounts of liquid entrainment.

Importantly, all of the aforementioned improvements and benefits were achieved without any reduction in conversion (vs. conventional processes). For Examples 1-3, conversions were maintained at high levels, e.g. over 90%. This, the disclosed processes provide for the beneficial combination of low heat flux, reduced temperature deltas, reduced foaming, improved residence time variation, and reduced skin temperature, all while maintaining high conversion.

EMBODIMENTS

The following embodiments are contemplated. All combinations of features and embodiments are contemplated.

Embodiment 1

A process for preparing polyamides, the process comprising: providing an aqueous monomer solution comprising amide monomers; evaporating the aqueous monomer solution to form a concentrated monomer solution; and polymerizing the concentrated monomer solution in a plug flow reactor comprising a shell side and a tube side to form a first process fluid comprising polyamides, wherein the shell side comprises an inlet and an outlet, wherein the concentrated monomer solution flows on the shell side from the inlet to the outlet.

Embodiment 2

An embodiment of embodiment 1, wherein the tube side comprises a plurality of U-tubes each including an inlet and an outlet for conveying a heating fluid therethrough, and wherein the tube side has a heat transfer area, and wherein the heating fluid has a specific enthalpy, H value at atmospheric pressure, less than 2,900 kJ/kg.

Embodiment 3

An embodiment of any of embodiments 1 and 2, wherein a ratio of the heat transfer area ($ft^2$) to a total volume ($ft^3$) of the concentrated monomer solution ranges from 1:1 to 30:1, e.g., from 3:1 to 30:1.

Embodiment 4

An embodiment of any of embodiments 1-3, wherein a ratio of the heat transfer area ($ft^2$) to a total volume ($ft^3$) of heat transfer fluid ranges from 1:1 to 200:1, e.g., from 5:1 to 200:1.

Embodiment 5

An embodiment of any of embodiments 1-4, wherein a skin temperature of the plug flow reactor is less than 290° C.

Embodiment 6

An embodiment of any of embodiments 1-5, the process has a heat flux rate less than 11400 BTU/hr-$ft^2$ Embodiment 7

An embodiment of any of embodiments 1-6, wherein the skin temperature of the plug flow reactor is less than 290° C., wherein the ratio of the heat transfer area to the total volume of concentrated monomer solution ranges from 3:1 to 20:1, and conversion of amide monomer to polyamides is greater than 85%.

Embodiment 8

An embodiment of any of embodiments 1-7, wherein a ratio of the heat transfer area to the volume of heat transfer fluid is greater than 80:1, and a residence time of the concentrated monomer solution ranges from 50 minutes to 60 minutes, and conversion of amide monomer to polyamides is greater than 85%.

Embodiment 9

An embodiment of any of embodiments 1-8, wherein a residence time of the concentrated monomer solution in the plug flow reactor ranges from 2 minutes to 100 minutes, and wherein a residence time distribution varies by +/−4%, based on an average residence time, and conversion of amide monomer to polyamides is greater than 90%.

Embodiment 10

An embodiment of any of embodiments 1-9, wherein a ratio of the heat transfer area to the volume of heating fluid ranges from 80:1 to 115:1, and wherein the residence time distribution varies by +/−2%, based on an average residence time, and the skin temperature of the reactor is less than 290° C.

Embodiment 11

An embodiment of any of embodiments 1-10, wherein the plug flow reactor is a horizontal reactor.

Embodiment 12

An embodiment of any of embodiments 1-11, wherein a residence time distribution varies by +/−8%, based on an average residence time.

Embodiment 13

An embodiment of any of embodiments 1-12, wherein conversion of amide monomer to polyamides is at least 85%.

Embodiment 14

An embodiment of any of embodiments 1-13, wherein a temperature change of the heat transfer fluid from the inlet to the outlet ranges from 0° C. to 50° C.

Embodiment 15

An embodiment of any of embodiments 1-14, further comprising: separating water from the concentrated monomer solution to form a water vapor during polymerization; and supplying the water vapor to a disengagement region of the plug flow reactor.

Embodiment 16

An embodiment of any of embodiments 1-15, wherein the disengagement region has a height of at least 0.05 m.

Embodiment 17

An embodiment of any of embodiments 1-16, wherein the vapor stream comprises less than $15.0 \times 10^{-7}$ wt % of entrained liquid, e.g., less than $3.0 \times 10^{-7}$ wt %.

Embodiment 18

An embodiment of any of embodiments 1-17, wherein the aqueous monomer solution comprises diacid and diamine, wherein a molar ratio of the diacid to the diamine is at least 1:1.

Embodiment 19

An embodiment of any of embodiments 1-18, wherein the molar ratio of the diacid to the diamine is at least 1:1, and a residence time of the concentrated monomer solution is from 2 min to 100 min, and a conversion of amide monomer to polyamides is greater than 90%.

Embodiment 20

An embodiment of any of embodiments 1-19, wherein the plug flow reactor is operated at a temperature from 200° C. to 300° C. and a pressure from 13.5 bar to 18 bar.

Embodiment 21

An embodiment of any of embodiments 1-20, wherein the plug flow reactor is operated at a temperature from 200° C. to 300° C., and the pressure is from 14 bar to 18 bar, and wherein a conversion of amide monomer to polyamides is greater than 85%.

Embodiment 22

An embodiment of any of embodiments 1-21, further comprising flashing the first process fluid after polymerization.

Embodiment 23

A process for retrofitting a polycondensation process including an existing evaporator for concentrating a monomer solution and an existing reactor for forming polyamides, the process comprising: polymerizing the concentrated monomer solution in a plug flow reactor comprising a shell side and a tube side to form a first process fluid, wherein the shell side has an inlet and an outlet; feeding the first process fluid to the existing reactor; and polymerizing the first process fluid to form a second process fluid, wherein the monomer solution flows on a shell side from the inlet to the outlet.

Embodiment 24

An embodiment of embodiment 23, wherein the plug flow reactor and the existing reactor are arranged in series.

Embodiment 25

An embodiment of any of embodiments 23 and 24, wherein the tube side comprises a plurality of U-tubes each comprising an inlet and an outlet for conveying a heating fluid therethrough, and wherein the tube side has a heat transfer area, and wherein the heating fluid has a specific enthalpy, H value at atmospheric pressure, less than 2,900 kJ/kg.

Embodiment 26

An embodiment of any of embodiments 23-25, wherein a ratio of the heat transfer area to a total volume of the concentrated monomer solution is in a range from 1:1 to 30:1, e.g., from 3:1 to 30:1.

Embodiment 27

An embodiment of any of embodiments 23-26, wherein a ratio of the heat transfer area to a total volume of heat transfer fluid is in a range from 1:1 to 200:1, e.g., from 5:1 to 200:1.

Embodiment 28

An embodiment of any of embodiments 23-27, further comprising: flashing the concentrated monomer solution to form a flashed monomer solution; and feeding the flashed monomer solution directly to the plug flow reactor.

Embodiment 29

An embodiment of any of embodiments 23-28, wherein the first process fluid comprises 85 wt. % to 92 wt. % of low molecular weight polyamides, based on the total weight of the first process fluid.

Embodiment 30

An embodiment of any of embodiments 23-29, wherein the second process fluid comprises 93 wt. % to 97 wt. % of high molecular weight polyamides, based on the total weight of the second process fluid.

Embodiment 31

A system for preparing polymers, comprising: a vessel including an aqueous monomer solution; an evaporator for concentrating the aqueous monomer solution to form a concentrated monomer solution; a plug flow reactor comprising a shell side and a tube side for polymerizing the concentrated monomer solution to form polyamides, wherein the shell side comprises an inlet and an outlet, and wherein the concentrated monomer solution flows on a shell side from the inlet to the outlet.

Embodiment 32

An embodiment of embodiment 31, wherein the tube side comprises a plurality of U-tubes comprising an inlet and an outlet for conveying a heating fluid therethrough, and wherein the tube side has a heat transfer area.

Embodiment 33

An embodiment of any of embodiments 31 and 32, further comprising a second reactor downstream from the plug flow reactor, wherein the plug flow reactor and second reactor are arranged in series.

Embodiment 34

An embodiment of any of embodiments 31-33, further comprising a preheater for heating the concentrated monomer solution to a temperature in a range from 180° C. to 230° C. before feeding the concentrated monomer solution to the plug flow reactor.

Embodiment 35

An embodiment of any of embodiments 31-34, further comprising a flasher for flashing the concentrated monomer solution.

Embodiment 36

A process for preparing polyamides in a plug flow reactor, the process comprising: selecting a desired first process fluid molecular weight in a range between 700 g/mol and 150,000 g/mol; providing an aqueous monomer solution comprising amide monomers; evaporating the aqueous monomer solution to form a concentrated monomer solution; polymerizing the concentrated monomer solution in a plug flow reactor comprising a shell side and a tube side to form a first process fluid comprising polyamides, controlling a heat flux rate of the process to be less than 11400 BTU/hr-ft$^2$; and maintaining a residence time of a concentrated monomer solution in the plug flow reactor from 2 minutes to 100 minutes; wherein the residence time distribution varies by +/−4%; or wherein the first process fluid molecular weight corresponds to the desired first process fluid molecular weight.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference. In addition, it should be understood that embodiments of the invention and portions of various embodiments and various features recited herein and/or in the appended claims may be combined or interchanged either in whole or in part. In the foregoing descriptions of the various embodiments, those embodiments which refer to another embodiment may be appropriately combined with other embodiments as will be appreciated by one of skill in the art.

We claim:

1. A process for preparing polyamides, the process comprising:
providing an aqueous monomer solution comprising amide monomers;
evaporating the aqueous monomer solution to form a concentrated monomer solution; and
polymerizing the concentrated monomer solution in a plug flow reactor comprising a shell side and a tube side to form a first process fluid comprising polyamides, wherein the shell side comprises an inlet and an outlet, wherein the concentrated monomer solution flows on the shell side from the inlet to the outlet.

2. The process of claim 1, wherein the tube side comprises a plurality of U-tubes each including an inlet and an outlet for conveying a heating fluid therethrough, and wherein the tube side has a heat transfer area, and wherein the heating fluid has a specific enthalpy, H value at atmospheric pressure, less than 2,900 kJ/kg.

3. The process of claim 2, wherein a ratio of the heat transfer area (ft$^2$) to a total volume (ft$^3$) of the concentrated monomer solution ranges from 3:1 to 30:1.

4. The process of claim 2, wherein a ratio of the heat transfer area (ft$^2$) to a total volume (ft$^3$) of heat transfer fluid ranges from 5:1 to 200:1.

5. The process of claim 2, wherein a skin temperature of the plug flow reactor is less than 290° C.

6. The process of claim 1, wherein the process has a heat flux rate less than 11400 BTU/hr-ft$^2$.

7. The process of claim 1, wherein a residence time distribution varies by +/−8%, based on an average residence time.

8. The process of claim 1, wherein conversion of amide monomer to polyamides is at least 85%.

9. The process of claim 1, further comprising:
separating water from the concentrated monomer solution to form a water vapor during polymerization; and
supplying the water vapor to a disengagement region of the plug flow reactor.

10. The process of claim 9 wherein the disengagement region has a height of at least 0.05 m.

11. The process of claim 10, wherein the vapor stream comprises less than 15.0×10$^{-7}$ wt % of entrained liquid.

12. A process for retrofitting a polycondensation process including an existing evaporator for concentrating a monomer solution and an existing reactor for forming polyamides, the process comprising:
polymerizing the concentrated monomer solution in a plug flow reactor comprising a shell side and a tube side to form a first process fluid, wherein the shell side has an inlet and an outlet;
feeding the first process fluid to the existing reactor; and
polymerizing the first process fluid to form a second process fluid, wherein the monomer solution flows on a shell side from the inlet to the outlet.

13. The process of claim 12, wherein the plug flow reactor and the existing reactor are arranged in series.

14. The process of claim 12, wherein the tube side comprises a plurality of U-tubes each comprising an inlet and an outlet for conveying a heating fluid therethrough, and wherein the tube side has a heat transfer area, and wherein the heating fluid has a specific enthalpy, H value at atmospheric pressure, less than 2,900 kJ/kg.

15. The process of claim 12, wherein a ratio of the heat transfer area to a total volume of the concentrated monomer solution is in a range from 3:1 to 30:1.

16. The process of claim 12, wherein a ratio of the heat transfer area to a total volume of heat transfer fluid is in a range from 5:1 to 200:1.

17. A system for preparing polymers, comprising:
a vessel including an aqueous monomer solution;
an evaporator for concentrating the aqueous monomer solution to form a concentrated monomer solution;
a plug flow reactor comprising a shell side and a tube side for polymerizing the concentrated monomer solution to form polyamides, wherein the shell side comprises an inlet and an outlet, and
wherein the concentrated monomer solution flows on a shell side from the inlet to the outlet.

18. The system of claim 17, wherein the tube side comprises a plurality of U-tubes comprising an inlet and an outlet for conveying a heating fluid therethrough, and wherein the tube side has a heat transfer area.

19. The system of claim 17, further comprising a second reactor downstream from the plug flow reactor, wherein the plug flow reactor and second reactor are arranged in series.

20. A process for preparing polyamides in a plug flow reactor, the process comprising:
selecting a desired first process fluid molecular weight in a range between 700 g/mol and 150,000 g/mol;
providing an aqueous monomer solution comprising amide monomers;
evaporating the aqueous monomer solution to form a concentrated monomer solution;
polymerizing the concentrated monomer solution in a plug flow reactor comprising a shell side and a tube side to form a first process fluid comprising polyamides,
controlling a heat flux rate of the process to be less than 11400 BTU/hr-ft$^2$; and
maintaining a residence time of a concentrated monomer solution in the plug flow reactor from 2 minutes to 100 minutes;
wherein the residence time distribution varies by +/−4%; or
wherein the first process fluid molecular weight corresponds to the desired first process fluid molecular weight.

* * * * *